Patented Dec. 31, 1968

3,419,580
KETONE ACETALS AND ORTHOESTERS
William C. Kuryla, St. Albans, W. Va., assignor to Union Carbide Corporation, a corporation of New York
No Drawing. Continuation-in-part of application Ser. No. 292,478, July 2, 1963. This application Apr. 2, 1965, Ser. No. 450,178
11 Claims. (Cl. 260—347.8)

This invention relates to novel ketene acetals and orthoesters and a novel process for the preparation thereof.

This application is a continuation-in-part of application Ser. No. 292,478 now abandoned, filed July 2, 1963 in the name of the same inventor as on the instant application.

Ketene acetals and orthoesters have heretofore been prepared by a variety of methods. Ketene acetals have been produced by dihydrohalogenation of a haloacetal with potassium-t-butoxide in tertiary butanol, and by the reaction of an α-bromoorthoester with metallic sodium. Orthoesters have been obtained by the alcoholysis of an aminoester hydrochloride obtained from the reaction of alcoholic hydrogen chloride.

It has now been found that a new class of ketene acetals and orthoesters may be synthesized by a novel process by the slow addition of a dihaloalkene to a basic hydroxy compound, such as an alkali metal alcoholate having an electron donating atom in the position beta or gamma to the alcoholate oxygen atom.

In accordance with this novel process there are produced novel ketene acetals and orthoesters represented by the general Formula I:

(I) 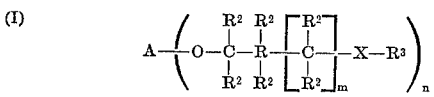

wherein $n$ is an integer of from 2 to 3, wherein $m$ is zero or 1, and wherein A, depending upon the value of $n$, represents a radical selected from the group consisting of tertiary radicals of the formula

and secondary radicals of the formula

wherein R is alkyl or chloroalkyl and $R^1$ is alkylidene or chloroalkylidene. The novel compounds of this invention may be accordingly represented by the ketene acetals of the following Formula II and orthoesters of the Formula III (II) 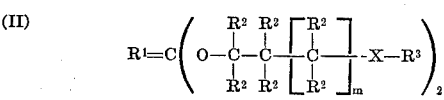

(III) 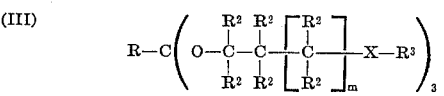

wherein $R^1$ and R are as hereinbefore described, and preferably contain from 1 to 4 carbon atoms, highly preferably are alkylidene or alkyl respectively; wrehein X represents an electron donating moiety selected from the group of oxygen, or

wherein R″ is alkyl of from 1 to 4 carbon atoms; wherein each $R^2$ individually represents hydrogen, alkyl, aryl, aralkyl, or alkaryl, or when taken with $R^3$ represents a saturated divalent chain which forms a heterocyclic ring containing X as a heterocyclic atom; and wherein $R^3$ represents alkyl, aryl, alkaryl, aralkyl, alkoxyalkyl or polyalkoxyalkyl and when taken with any $R^2$ represents a saturated divalent chain which forms a heterocyclic ring containing X as a heterocyclic atom. Accordingly, when $R^3$ is selected in this manner, together with an $R^2$ substituent, there may be formed a heterocyclic ring containing up to 2, preferably 1 aza or oxa heterocyclic atom. Such heterocycles which may be formed include tetrahydrofuryl, pyrrolidenyl, oxalanyl, imidazolidenyl, tetrahydropyranyl, dioxamyl, piperidyl, piperazanyl, morpholinyl and the like. Preferably said heterocyclic ring contains 5 or 6 members. It is highly preferred that $R^3$ and $R^2$ when selected together in this manner form an alkylene chain and thus result in the formation of a monoheterocyclic ring of 5 to 6 members. The said chain obtained formed by a combination of $R^3$ and $R^2$ in this manner may be branched so as to result in the formation of an alkyl substituted heterocycle, said substituents containing up to about 4 carbon atoms. Suitable substituents above are alkyl groups of from about 1 to 8 carbon atoms and monocyclic and bicyclic hydrocarbon aryl, alkaryl, and aralkyl groups containing 6 to 12 carbon atoms, such as phenyl, benzyl, tolyl, ethylbenzyl, naphthyl and the like.

Eminently preferred for $R^3$ are polyoxyalkylene radicals having from 2 to 4 carbon atoms in each alkylene unit capped with an alkyl group such as the monoalkyl etheric radicals of polyoxyethylene glycol, polyoxypropylene glycol, polyoxybutylene glycol, and poly[mixed oxyethyleneoxypropylene]glycol and the like.

It is pointed out that the above structural formulae are deemed to include mixed ketene acetals and mixed orthoesters wherein the substituents on the radical generically designated A in Formula I are dissimilar.

In a first preferred embodiment the novel compounds of this invention are derived from polyalkyleneoxy alcohols. The novel ketene acetals, in accordance with this embodiment may be characterized by the formula:

(IV) 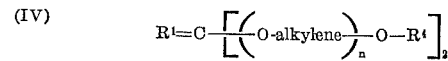

and the orthoesters, by the formula:

(V) 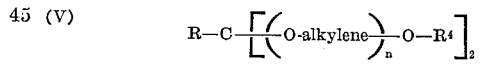

wherein $R^1$ and R are as hereinbefore defined, wherein the alkylene group is a 1,2-alkylene group or a 1,3-alkylene group, and preferably contains from 2 to 4 carbon atoms such as ethylene, 1,2-propylene, 1,3-propylene, 2,3-butylene, 1,2-butylene or 1,3-butylene, wherein $R^4$ is alkyl or aryl as hereinbefore set forth, preferably alkyl of from 1 to 6 carbon atoms, and wherein $n$ is an integer of at least one designating the number of repeating alkyleneoxy groups. It is pointed out that the alkyleneoxy chain may be heterogeneous, e.g., may be made up of mixed ethyleneoxy and propyleneoxy groups containing from 1 to 25 preferably 1 to 10 alkyleneoxy groups.

The novel compounds of this invention include ketene acetals and haloketene acetals including "mixed" ketene acetals wherein the two etheric moieties are dissimilar. Included among the novel ketene acetals of this invention are the ketene and haloketene acetals, including ketene di(2-methoxyethyl) acetal,
ketene di(3-ethoxypropyl) acetal,
methylketene di(2-sec-butoxypropyl)
chloroethylketene di(3-isopropoxypropyl) acetal,
bromoketene di(2-methoxybut-3-yl) acetal,
chloroethyl(3-ethoxybutyl) acetal,
chloromethylketene di(3-n-hexoxy-propyl) acetal, propylketene di(2-phenoxyethyl) acetal,
isopropylketene di(2-benzyloxyethyl) acetal,
chloroethylketene di(3-[p-methylphenyl]propyl) acetal,
ketene di(2-(N,N-dimethylaminoethyl)) acetal,
di(3-(N-ethylaminopropyl)) acetal,
methylketene di(3-tetrahydrofurfuryl) acetal,
methylketene di(2-tetrahydrofurfuryl) acetal,
methylketene di(3-tetrahydrofuryloxy) acetal,
methylketene-di(2-pyrrolidinylmethyl) acetal,
isopropylketene di(3-pyrrolidinyl) acetal,
butylketene di(4[1,2-oxazolidinylmethyl])acetal,
ethylketene di(4-[1,3-oxolanylmethyl])acetal,
hexylketene di(4-ethyl-3-piperidinyl) acetal,
bromoketene di(3-piperidinylmethyl) acetal,
methylketene di(2-[N-ethylpiperidinylmethyl])acetal,
ketene di(2-morpholinyl) acetal,
ethylketene di(N-piperizinylethyl) acetal, as well as mixed ketene acetals which may be made by using a mixed alcoholate feed as will be obvious hereinafter, such as methylketene 2-methoxyethyl, 3-methoxypropyl acetal and the like; the polyoxyalkylene ketene acetals such as ethylketene di(ethoxypoly-1,3-propoxy) acetal, methylketene di-(methoxypoly-1,2-ethoxy) acetal, methylketene di(butoxy poly-2,3-butoxy) acetal, chloroketene (butoxy poly[mixed-1,2-ethoxy-1,2-propoxy]) acetal, and the like.

The novel orthoesters which may be produced by the process of this invention include tri(2-methoxyethyl) orthoacetate, tri(2-methoxyethyl) orthopropionate, tri(2-ethoxy-2,3-butyl) orthochloroacetate, tri(3-ethoxypropyl) orthobutyrate, tri(3-phenylmethoxypropyl) orthoacetate, tri(2-isopropoxypropyl) orthopropionate, tri(2-ethoxy-2-phenylethyl) orthoacetate, tri(3-phenoxybutyl) orthoacetate, tri[2-(p-tolyloxy)] orthoacetate, tri(2-hexoxyethyl) orthobromoacetate, the orthoacetates and chloroorthoacetates of dipropylene glycol monomethyl ether, the orthopropionates and orthobromopropionates of triethylene glycol monomethyl ether, the orthoacetates and orthochloroacetates of methoxy polyethylene glycol, ethoxy polyethylene glycol, and butoxy poly-1,2-propylene glycol, and butoxy poly-1,3-propylene glycol, the orthopropionates, orthochloropropionates, and orthobromobutyrates of methoxy polyethylene glycol, ethoxy polyethylene glycol, butoxy polyethylene glycol and the like, the orthoacetates and chloroorthoacetates of methoxy poly-1,2-propylene glycol, tri(ethoxy poly-1,3-propylene glycol) ortho-2,3-dimethylbutyrate, tri(ethoxy polypropylene glycol) orthopropionate, tri(butoxy poly-1,2-propylene glycol) orthoacetate, tri(butoxy poly[mixed oxyethylene-oxy-1,2-propylene]-glycol) orthoacetate, tri(butoxy poly[mixed oxyethyleneoxy-1,2-propylene]glycol) orthopropionate, tri(ethoxy poly[mixed oxyethyleneoxy-1,2-propylene]glycol) orthochloroacetate, the orthoacetate and chloroorthoacetate of tetrahydrofurfuryl alcohol, the orthopropionate of α-tetrahydrofurfuryl alcohol, the orthobutyrate of β-tetrahydrofurfuryl alcohol, the orthoacetate and orthochloroacetate of N,N-diethyl isopropanolamine, N,N-dimethyl ethanol amine, and N-methyl-2-piperidylmethanol, the orthoacetate and orthochloroacetate of N,N-diethyl-2-piperazinylethanol, the orthopropionate of N,N-dimethylethanol amine, the orthobutyrate of N,N-dipropyl propanolamine methoxyethyl ortho-2-methylbutyrate, tri-(butoxy dipropylene glycol) ortho-2-methylpropionate, the ethoxy polyethylene glycol orthoester of 3-ethylpropionic acid, and the like.

This novel process comprises the slow addition of a dihaloalkene to a basic hydroxy compound such as an alkali metal alcoholate which has an electron donating atom in the beta or gamma position. The novel process may be illustrated by the following reaction between the sodium alcoholate of methoxyethanol and vinylidene chloride to produce ketene di(methoxyethyl) acetal CH₃—O—CH₂CH₂—ONa + CH₂=CCl₂ →
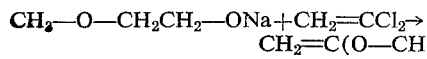
CH₂=C(O—CH₂CH₂—OCH₃)₂

Since this reaction will only proceed using a basic alcoholate of a compound which is characterized by an electron donating atom, e.g., oxygen, in the beta or gamma position. It is postulated that perhaps the unusual activity of the alcoholate in this novel synthesis results from a quasicyclic intermediate which is formed by the alcoholate, and which accordingly markedly increases the basicity of the alkoxide oxygen. This is illustrated by the following Sodium-β-alkoxyalcoholate

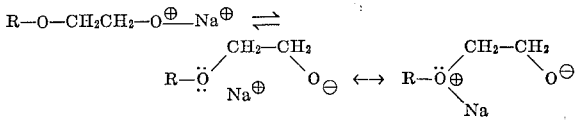

Sodium-γ-alkoxyalcoholate

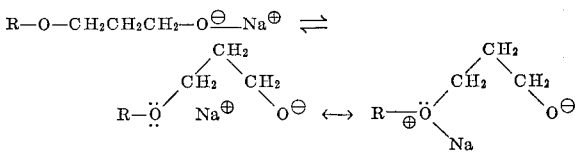

It is known that 5-membered and 6-membered rings are most stable, and thus it would be reasonable to assume that the activation of the electron donative atom, in this case the alkoxide oxygen would be greatest when it existed in the beta or gamma, since these positions would result in five and six membered quasicycles respectively. This theory is supported by the fact that alcoholates having an electron donative atom in the alpha or delta positions will not produce ketene acetals or orthoesters despite the variance of reaction conditions. Of course a quasicyclic intermediate of these alcoholates would be four membered or seven membered, respectively, and accordingly much less stable. Similarly hydrocarbyl alcoholates exhibits no reactivity in the novel process of this invention.

Accordingly, although applicant does not wish to bind himself by the theory proposed above, it is deemed to illustrate the singular nature and surprising efficacy of the instant process which will become better understood by a consideration of the following disclosure and examples.

Both the ketene acetals and orthoesters of this invention are prepared in substantially the same manner. The products obtained will depend upon the mole ratios of reactants employed as well as upon the steric nature of these reactants. In order to produce the novel ketene acetals of this invention, it is desirable to employ approximately two moles of the alkali metal alcoholate for each mole of the dihaloalkene, and to conduct the reaction in an inert solvent medium. Thus, for example, ketene methoxyethyl acetal is produced from the sodium alcoholate of ethylene glycol monomethyl ether and vinylidene chloride as follows:

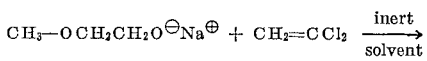
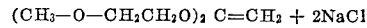
(CH₃—O—CH₂CH₂O)₂ C=CH₂ + 2NaCl

However, when it is desired to form the orthoester the alkali metal alcoholate is employed in a solution of the alcoholic hydroxy compound from which it is derived, the said solution providing at least one additional mole of the alcoholic hydroxy compound. Thus, orthoester formation may occur when this additional mole of alcoholic hydroxy compound combines with the ketene acetal (CH₃—OCH₂CH₂—O)₂C=CH₂
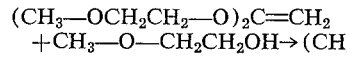
+CH₃—O—CH₂CH₂OH → (CH₃OCH₂CH₂O)₃C—CH₃

The orthoester formation is catalyzed by acid, and hence although often the reaction may be directed to the orthoester product by using a greater mole ratio of basic alcoholate to dihaloalkene, the addition of acid to the original reaction mixture or to a mixture of ketene acetal and alcoholate will promote the production of the orthoester as the final product. Suitable acids for this purpose are the mineral acids such as sulfuric acid, phosphoric acid, and sulfonic acid. It is apparent from this reaction that if the solvent medium is an alcohol other than that from which the alkali metal alcoholate was produced, that a mixed orthoester product will result. Of course, a mixed acetal or orthoester product may also be produced by using a mixture of alkali metal alcoholates.

Steric considerations will also effect this second reaction to form the orthoester product. For example, if the sodium alcoholate of propylene glycol monomethyl ether is reacted with vinylidene chloride, in accordance with this invention, even if the solvent medium employed is the alcohol, i.e., propylene glycol monoethyl ether, rather than an inert solvent, the steric effect of the pendant methyl group may be such as to halt the reaction when the ketene methoxypropyl acetal is synthesized and impede production of the orthoester. Since the production of the orthoester from the ketene acetal is acid-catalyzed, it may be necessary to further acidify the reaction mixture in the presence of excess alcohol, in order to drive the reaction to the methoxypropyl orthoacetate product. Alternatively, if the sodium alcoholate of ethylene glycol monomethyl ether is reacted with vinylidene chloride, the steric hindrance is greatly reduced and the reaction will readily proceed to the methoxyethyl orthoacetate if conducted in the presence of ethylene glycol monomethyl ether. In fact to halt this reaction before production of the orthoester and produce ketene methoxyethyl acetal, the reaction must be conducted in an inert solvent and the prescribed two to one mole ratio of sodium alcoholate to vinylidene chloride should be observed.

The reaction is accompanied by an exotherm and completion of the reaction is signalled by the termination of the temperature rise.

Suitable alcoholic hydroxy compounds which may be employed in preparing the novel ketene acetals and orthoesters of this invention are similar in structure to the ketene acetal and the orthoester products, and may be identified by the presence of an electron donative atom in the position beta or gamma to the alcoholic hydroxy group. These alcoholic hydroxy compounds are represented by the formula:

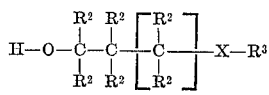

wherein $R^2$, $R^3$, and X have the designations as defined above. These compounds include the monoalkyl ethers of 1,2-alkylene glycols such as ethylene glycol monomethyl ether, ethylene glycol monoethyl ether, ethylene glycol monobutyl ether, ethylene glycol monohexyl ether, 1-phenoxy-2-ethanol, 1-benzyloxy-2-ethanol, 1-methoxy-1-phenyl-2-ethanol, 1-ethoxy-1,2-dimethyl-ethanol, 1-butoxy-2-benzyl-2-ethanol, 1-phenoxy-1-methyl-2-ethanol, 1-hexoxy-2-methyl-2-ethanol, and the like; the monoalkyl ethers of 1,3-glycols such as 1-methoxy-3-propanol, 1-butoxy-3-propanol, 1-phenoxy-3-propanol, 1-phenoxy-1-methyl-3-propanol, 1-butoxy-2-phenyl-3-propanol, 1-methoxy-3,3-dimethyl-3-propanol, 1-ethoxy-2,2-dimethyl-3-propanol, 1-methoxy-2-benzyl-3-propanol; the dialkyleneoxy, and polyalkyleneoxy compounds such as diethylene glycol monomethyl ether, diethylene glycol monoethyl ether, diethylene glycol monobutyl ether, di-1,2-propylene glycol monomethyl ether, and di-1,3-propylene glycol monomethyl ether, di-1,2-propylene glycol monobutylether, di-1,3-propylene glycol monohexyl ether, di-2,3-butylene glycol monoethyl ether, di-1,3-butylene glycol monoethyl ether, and the like; poly(oxyethylene) glycol monoethyl ether, poly(oxyethylene) glycol monobutyl ether, poly(oxy-1,2-propylene) glycol monobutyl ether, poly(oxy-1,3-propylene) glycol monomethyl ether, poly(oxy - 1,2-butylene) glycol monobutyl ether, poly(oxy-2,3-butylene) glycol monoethyl ether, poly(mixed oxyethylene-oxy-1,2-propylene) glycol monobutyl ether, poly(mixed oxyethylene-oxy-1,3-propylene) glycol monoethyl ether and the like; 3-tetrahydrofurfuryl alcohol, 2-tetrahydrofurfuryl alcohol, N,N-dimethylethanolamine, N,N-diethylethanol amine, N-methyl-3-propanol amine, N-ethyl-N-butylethanolamine, N-butyl-3-piperidinyl alcohol, N-ethyl-3-piperizinyl alcohol, and the like.

The dihaloalkenes which are suitable for use in this invention include the dihalo-α-olefins of the formula:

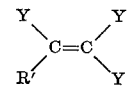

wherein Y is halogen or hydrogen and R' is hydrogen or alkyl with the proviso that at least two Y moieties are halogen and providing if R' is alkyl at least one Y moiety is hydrogen. Thus these reactants include 1,1-dihalo-α-olefins, 1,2-dihalo-α-olefins, and 1,1,2-trihaloethane. Both cis and trans forms of the 1,2-dihalo-α-olefins may be employed. Accordingly, suitable dihalo-α-olefins include vinylidene chloride, 1-chloro-1-bromoethane, 1-chloro-2-bromoethene, 1,1,2-trichloroethene, 1,2-dichloroethene, 1,2-diromoethene, 1,1-dichloro-1-prop-1-ene, 1,1-dichlorobut-1-ene, 1,1-dichloropent - 1-ene, 1,2-dichloropent-1-ene, 1,1-dichlorohex-1-ene, 1-chloro-1-bromohex-1-ene, 1,1,2-trichloro-1-prop-1-ene, 1-chloro - 1,2-dibromoprop-1-ene, 1,1,2-trichloro-1-but-1-ene, 1,1,2-pent-1-ene, 1,1,2-trichlorohex-1-ene, 1,1-dichloro - 2-phenylethene, 1,1-dichloro-2-benzylethene, 1,1-dichloro - 2-benzylprop-1-ene, 1,1-dichloro-2-bromoethene, 1,2-dichloroprop-1-ene, 1,1-dichloro-2-bromopentene, and the like. Preferred halo-α-olefins are those wherein halogen is chlorine or bromine, particularly chlorine and which contain from 2 to 5 carbon atoms such as vinylidene chloride, 1,1,2-trichloroethene, 1,1-dichloroprop-1-ene, 1,1,2-trichloroprop-1-ene, 1,1-dichlorobut-1-ene, 1,1,2-trichlorobut-1-ene, and the like.

A direct synthesis of "mixed" ketone acetals may be achieved by an alternate route by which a full yield of the mixed product can be obtained. Of course, by proceeding to synthesize mixed ketene acetals by utilizing a mixture of basic alcoholates in the procedure as above, a statistical yield of any single mixed ketene acetal bearing different etheric moieties corresponding to the basic alcoholates will be obtained. Accordingly there is provided by this invention a direct synthetic method for producing mixed ketene acetals which method comprises contacting a basic alcoholate, derived from an alcoholic hydroxy compound as hereinbefore described, and a β-halo-α,β-alkenyl ether of the formula:

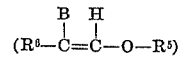

wherein $R^6$ is hydrogen, alkyl, or haloalkyl preferably of up to 3 carbon atoms, wherein B is halogen, and wherein $R^5$ represents a radical of the scope of $R^3$, defined above or is a radical having an electron donative atom in the gamma or beta position said radical corresponding to the formula:

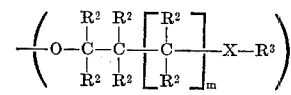

wherein $R^2$, $R^3$, X and m are as hereinbefore defined.

The direct synthetic method is most easily effected by adding the basic alcoholate of the alcoholic hydroxy compound to the haloalkenyl ether preferably in a solvent medium. The reaction proceeds to give a mixed acetal having one etheric moiety corresponding to the basic alcoholate and one etheric moiety corresponding to the R⁴ substituent of the haloalkenyl ether:

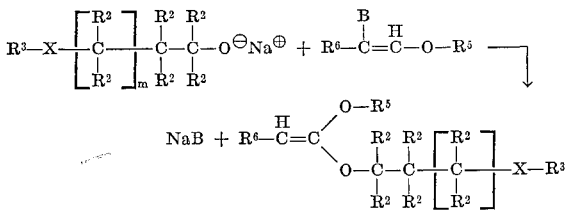

wherein $R^2$, $R^3$, $R^6$, $R^5$, X, B, and $m$ are as above designated. These ketene acetals may of course be further reacted with an additional mole of alcoholic hydroxy compound, in the presence of an acidic catalyst if necessary, to produce the mixed orthoester product.

The β-halo-α,β-alkenyl ethers which can be employed in the direct acetal synthesis above may be synthesized by contacting an α,β-alkenyl ether with halogen in the presence of a dihydrohalogenating agent such as a tertiary amine, e.g., triethylamine, pyridine, or N,N-dimethylaniline. The synthesis of α-bromoethenyl ether from vinyl ethyl ether, in the presence of N,N-dimethyl aniline is illustrative

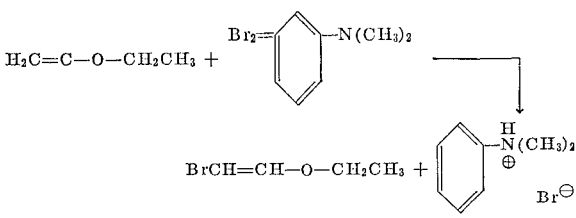

Accordingly, suitable β-halo-α,β-alkenyl ethers useful in the direct mixed acetal synthesis include α-bromoethylenyl ethyl ether, α-chloroethenyl ethyl ether, α-chloro-α,β-butenyl ethyl ether, α-chloroethenyl hexyl ether, α-chloro-α,β-propenyl phenyl ether, α-chloroethenyl benzyl ether, α-chloroethenyl p-tolyl ether, α-bromoethenyl 2-(N,N-dimethylamino) ethyl ether, α,γ-dibromo-α,β-propenyl-3-tetrahydrofuranyl ether, the α-chloroethenyl ether of butoxy poly(oxyethylene) glycol, and the like.

The direct mixed acetal synthesis proceeds under essentially the same conditions as does the acetal.

The novel process for producing ketene acetals and orthoesters is advantageously conducted by slowly adding the dihalo-α-olefin, with stirring to a strongly basic solution of an alcoholate of the described hydroxy compound in the alcohol.

The direct mixed acetal synthesis may be similarly carried out, in which case the α-halo-α,β-alkenyl ether is slowly added to a basic solution of the alcoholate. If desired, the reaction alcoholate mixture may be maintained in an inert organic solvent. This strongly basic solution may be conveniently prepared by mixing the compound with a Group Ia or IIa metal or a metal hydroxide thereof. Preferred operatives are sodium metal or sodium hydroxide. When preparing the alkali metal alcoholate from the metal hydroxide, the water of reaction and the water of the hydroxide solution is removed from the alcoholate by azeotropic distillation. The lower sodium alcoholates such as sodium methylate and sodium ethylate can also be employed. Potassium metal is difficult to handle as are metallic rubidium and cesium and, therefore, would not be preferred for preparation of these basic alcoholates though they would be operative. Potassium hydroxide when used in the place of sodium hydroxide gives an uncontrolled reaction and is, therefore, not preferred, although not inoperative. The basic solution of the alcoholic compound is prepared by the addition of the metal or metal hydroxide, as described above, such as sodium metal or sodium hydroxide, to the said alcoholic compound. In accordance with this invention and depending upon the product desired as hereinbefore set forth, the said alcoholate may be prepared in a solution of an excess of the alcohol or in an inert solvent such as diethylene glycol dimethyl ether, tetrahydrofuran, xylene, n-heptane and the like.

Inasmuch as the reaction produces an exotherm, the temperature of the reaction medium may be conveniently controlled by a slow measured addition of the halide compound accompanied by stirring to assure the mixture of the reactants. The reaction is accompanied by a concomitant precipitation of the alkali metal chloride, e.g., sodium chloride, corresponding to the metal used to basify the hydroxy compound. The direct mixed ketene acetal synthesis also produces the salt precipitate. This yield may conveniently be employed to calculate the completeness of the reaction. The reaction is preferably carried out under reflux conditions, and it is preferred that the addition rate of the chloride compound not be greater than the capacity of the reflux condenser under the prevailing conditions. The completion of the reaction is signalled by a termination of the exotherm.

Normally the starting temperature and starting pressure for the novel process are not narrowly critical. Ambient temperatures are suitable at the start of the reaction. The temperature increase resulting from the exotherm is desirably controlled, as hereinbefore described, so as not to cause the reaction to exceed the reflux capacity. Normally, the temperature is not permitted to exceed about 200° C. under operating conditions although no criticality is imputed. Pressure is not critical and the reaction may be conducted at subatmospheric, atmospheric or superatmospheric pressure.

The reaction of the novel process is suitably conducted under an inert atmosphere such as nitrogen, since air will cause oxidation of the strongly basic reactants.

The ketene acetals of this invention will give high polymers in the presence of even a small amount of acid, and will undergo polymerization to form a film on the surface of a glass container by virtue of acidic surface of the glass. Accordingly, storage of ketene acetals is generally facilitated by avoiding acidic conditions in the storing container. Washing of such containers with alkali prior to introduction of the ketene acetal is hence preferred.

The ketene acetals of this invention may be satisfactorily and efficiently polymerized using an acidic catalyst but these ketene acetals do not respond to free radical catalysts of the peroxide type. Suitable catalysts include the metal chlorides and non-ionic acids such as calcium chloride, cadmium chloride, aluminum chloride, stannic chloride, zinc chloride, boron fluoride and the like. The catalysts are preferably used in anhydrous form, and the polymerization proceeds at room or slightly elevated temperatures, i.e., up to about 100° C. The polymerization proceeds through the unsaturation of the acetal to produce a polymer having a basic repeating unit as follows as for example in the case of ketene di(2-methoxyethyl acetal):

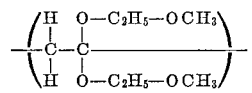

This polymer structure, of course may be extrapolated to encompass those ketene acetals generally represented by Formula II supra.

In addition, the acidic catalysts above may also be utilized to catalyze the copolymerization of the novel ketene acetals of this invention with other olefinic monomers which respond to ionic polymerization. Preferred comonomers are the vinyl alkyl ethers wherein said alkyl portion contains from 2 to about 18 carbon atoms, preferably 2 to 8 carbon atoms. Illustrative of these vinyl alkyl ethers are vinyl ethyl ether, vinyl butyl ether, vinyl pentyl ether, vinyl hexyl ether, vinyl 2-methylpentyl ether, vinyl 2-ethylhexyl ether, vinyl octyl ether, vinyl dodecyl ether, vinyl octadecyl ether and the like. By appropriate choice of the ketene acetal and the vinyl alkyl ether comonomer these polymers may be rendered water soluble or water insoluble by adjusting the number of hydrophilic ethyleneoxy groups in the polymer. Likewise the ketene acetal homopolymers may also be water soluble depending upon the amount of ethyleneoxy linkages in the ketene acetal.

The orthoesters of the invention may be used as plasticizers and also have wide use as intermediates. Table I below summarizes the evaluation of methoxy diethylene glycol orthoacetate and tetrahydrofurfuryl orthoacetate as plasticizers in polyvinyl chloride.

TABLE I.—EVALUATION OF ORTHOACETATES AS PLASTICIZERS FOR VINYL CHLORIDE POLYMERS

| | Methoxy diethylene glycol orthoacetate | Tetrahydrofurfuryl orthoacetate |
|---|---|---|
| Plasticizer, concentration parts per hundred | 50 | 50 |
| Durometer A hardness [1] | 61 | 68 |
| $T_4$, °C.[2] | 6 | 9 |
| $T_B$, °C.[3] | −22 | −14 |
| Volatility, 24 hrs., 70° C., 20 mil weight percent [4] | 27.6 | 28.1 |
| Oil extraction, K[5] | 6.7 | 2.2 |
| Water extraction, percent [6] | 21.6 | 4.8 |
| Sweat out after 2 weeks | Slight | None |

[1] Durometer "A" hardness=an indentation measurement of hardness obtained with the Shore Durometer "A" head.
[2] $T_4$=points corresponding to 10,000 pounds per square inc respectively on a stiffness temperature curve obtained in accordance with the procedure set forth in the manual of ASTM D1043-51.
[3] $T_B$=Brittle temperature, the temperature obtained by means of low temperature impact test according to the procedure set forth in the manual of ASTM D746-52T.
[4] Volatility loss=value obtained in accordance with the procedure in the manual of ASTM D1023-52T.
[5] Oil extraction=determines the tendency of a plasticizer to be extracted by mineral oil. A four-mil film is immersed in mineral oil at 50° C. for a sufficient time to produce a weight loss of between 3 and 10 percent. The results are reported in terms of an extraction constant K.

$$K = \frac{W_1 - W_2}{a\sqrt{t}}$$

where
$W_1$=original weight in grams,
$W_2$=final weight in grams,
a=total area of plaque, in square meters,
t=time in hours.
[6] Water extraction=determines the tendency of a plasticizer to be extracted by water set forth by the procedure set forth in the American Society of Testing Materials, Bulletin No. 183, July, 1952. Expressed as percent by weight of loss from test specimen.

The amine-derived ketene acetals of this invention demonstrate excellent utility as polyurethane flexible foam catalysts. In such applications the amine-derived ketene acetals of this invention, i.e., derived from alcoholic hydroxy compounds having an amino nitrogen atom beta or gamma to the hydroxyl group performed were comparable to amines conventionally used and produced a five celled foam of high quality. The foaming formulation employed was the following, in parts by weight.

| | Parts |
|---|---|
| Polyol [1] | 100 |
| Water | 4.00 |
| Silicone surfactant | 2.00 |
| Stannous octoate | 0.30 |
| Tolylene diisocyanate | 49.7 |
| Ketene di[2-(N,N-dimethylamino)ethyl]acetal [2]. | |

[1] The polyol employed was a glycerol propylene oxide adduct having an average molecular weight of about 3000 and having a hydroxyl number of about 55.
[2] For usage of this compound in three batches, see second paragraph, below.

The polyol, silicone surfactant, water and the ketene di[2-(N,N-dimethylamino)ethyl]acetal were mixed using a drill press stirrer in a 2-liter stainless steel beaker for 55 seconds.

The stannous octoate was added and the mixture stirred for an additional 5 seconds before the tolylene diisocyanate was added. Stirring was continued for a 5 to 8 second period after which time the mixture was poured into a cardboard mold. The time required for the bun to rise to 1 to full height is defined as rise time. Three batches of foaming formulation were prepared using 0.05, 0 10 and 0.50 part by weight of ketene di[2-(N,N-dimethylamino)ethyl] acetal respectively. In addition one control formulation containing no amine catalyst was prepared. Rise times were as follows:

| | Rise time (sec.) |
|---|---|
| (a) 0.05 part | 94 |
| (b) 0.10 part | 90 |
| (c) 0.50 part | 77 |
| Control—no amine | 100 |

The following examples are illustrative.

EXAMPLE I

A mixture of the sodium alcoholate of propylene glycol monomethyl ether in the alcohol was prepared by reacting 11.1 moles of propylene glycol monomethyl ether (1000 grams) with 4.35 moles of metallic sodium (100 grams). To this mixture was slowly added, with stirring, 3.10 moles of vinylidene chloride under a nitrogen atmosphere. During the addition of the vinylidene chloride the temperature of the reaction mixture increased from 90° to 140° C. with the concomitant precipitation of sodium chloride. The reaction mixture was then filtered to yield a tan colored liquid filtrate and solid sodium chloride.

The solid was washed several times with anhydrous ether and was oven-dried to give 235 grams of sodium chloride which calculated as a 92.5 percent yield of sodium chloride based on the sodium used in the reaction.

The liquid filtrate was vacuum distilled to yield a distillate of 206 grams of the ketene acetal derivative of propylene glycol monomethyl ether which is ketene di(2-methoxypropyl) acetal (45.6 percent yield) having a boiling point of 87°–95° C. at 5.0 millimeters of mercury, and 58° C. at 3 millimeters of mercury. The distillate was analyzed as follows:

Analysis.—Calculated for $C_{10}H_{20}O_4$: C, 58.9; H, 9.9; O, 31.3. Found: C, 58.8; H, 10.1; O, 32.2. Molecular weight: Calculated 204. Found: 2.4(Menzies-Wright in benzene).

The infrared spectrum showed a very strong band at 1650 cm.$^{-1}$ indicating (C=CH$_2$).

EXAMPLE II

Two drops of 85 percent phosphoric acid were added to a solution 0.25 mole of the ketene di(2-methoxypropyl) acetal (51.0 grams) and 0.25 mole of propylene glycol monomethyl ether (22.5 grams), causing the temperature to rise from 20° to 70° C. The mixture was permitted to stand overnight at room temperature after which two small pellets of potassium hydroxide were added to the solution. The solution was vacuum distilled to yield, as the major fraction, methoxy propylene glycol orthoacetate which was analyzed as follows:

Analysis.—Calculated for $C_{14}H_{30}O_6$: C, 57.1; H, 10.3. Found: C, 56.9; H, 10.3. Molecular weight: Calculated 294. Found: 290(Menzies-Wright in benzene).

The infrared spectrum revealed that characteristic OH, C=O, C=CH$_2$ absorption bands were absent.

EXAMPLE III

A mixture of the sodium alcoholate of dipropylene glycol monomethyl ether in the alcohol was prepared by reacting 3.37 moles of dipropylene glycol monomethyl ether (500 grams) with 1.3 moles of metallic sodium (30 grams). To this mixture was slowly added, with stirring, 1.3 moles of vinylidene chloride under a nitrogen atmosphere. During the addition of the vinylidene chloride the temperature of the reaction mixture increased from 95° to 170° C. with the concomitant precipitation of sodium chloride. The reaction mixture was then filtered to yield a liquid filtrate and solid sodium chloride.

The solid was washed and oven dried to give 71 grams of sodium chloride which calculated as a 93 percent yield of sodium chloride based on the sodium used in the reaction.

The liquid filtrate was vacuum distilled to yield 42 grams of a distillate of the orthoacetate of dipropylene glycol monomethyl ether (13.8 percent yield) having a boiling point of 166° to 186° C. at 5.0 millimeters of mercury. A distillate fraction boiling at 166–186° C. at 5 millimeters of mercury was analyzed as follows:

*Analysis.*—Calculated for $C_{23}H_{48}O_9$: C, 59.1; H, 10.3; O, 30.8. Found: C, 58.2; H, 10.4; O, 35.1. Molecular weight: Calculated 468. Found: 388.

The infrared spectrum showed a small amount of carbonyl absorption indicating some chemical breakdown.

EXAMPLE IV

A mixture of the sodium alcoholate of ethylene glycol monoethyl ether in the alcohol was prepared by reacting 11.1 moles of ethylene glycol monoethyl ether (1000 grams) with 4.35 moles of metallic sodium (100 grams). To this mixture was slowly added, with stirring, 2.58 moles of vinylidene chloride under a nitrogen atmosphere during which the temperature of the reaction mixture increased from 100° to 160° C. with the concomitant precipitation of sodium chloride. The reaction mixture was then filtered to yield a liquid filtrate and solid sodium chloride.

The solid was washed and oven dried to give 230 grams of sodium chloride which calculated as a 91 percent yield of sodium chloride based on the sodium used in the reaction.

The liquid filtrate was vacuum distilled to yield 362 grams of a distillate of the orthoacetate of ethylene glycol monoethyl ether (56.6 percent yield) having a boiling point of 110° to 129° C. at 2 to 3 millimeters of mercury. The distillate fraction boiling at 98° to 100° C. at 0.5 millimeter of mercury was analyzed as follows:

*Analysis.*—Calculated for $C_{14}H_{30}O_6$: C, 57.1; H, 10.3. Found: C, 57.2; H, 10.3. Molecular weight: Calculated 294. Found: 281.

The infrared spectrum showed an absence of OH, C=O, and C=$CH_2$ absorption bands.

EXAMPLE V

A mixture of the sodium alcoholate of diethylene glycol monomethyl ether in the alcohol was prepared by reacting 8.34 moles of diethylene glycol monomethyl (1000 grams) with 4.35 moles of metallic sodium (100 grams). To this mixture was slowly added, with stirring, 2.58 moles of vinylidene chloride under a nitrogen atmosphere during which the temperature of the reaction mixture increased from 85° to 185° C. with the concomitant precipitation of sodium chloride. The reaction mixture was then filtered to yield a liquid filtrate and solid sodium chloride.

The solid was washed and oven dried to give a quantitative yield of sodium chloride based on the sodium used in the reaction.

The liquid filtrate was vacuum distilled to yield 255 grams of distillate of the orthoacetate of diethylene glycol monomethyl ether (30.5 percent yield) having a boiling point of 184° to 196° C. at 2.0 millimeters of mercury. The distillate boiling at 170° to 172° C. at 0.5 millimeter of mercury was analyzed as follows:

*Analysis.*—Calculated for $C_{17}H_{36}O_9$: C, 53.5; H, 9.5. Found: C, 52.1; H, 9.5. Molecular weight: Calculated 384. Found: 376.

The infrared spectrum showed an absence of the OH, C=O, and C=$CH_2$ absorption bands.

EXAMPLE VI

A mixture of the sodium alcoholate of tetrahydrofurfuryl alcohol in the alcohol was prepared by reacting 9.80 moles of tetrahydrofurfuryl alcohol (1000 grams) with 3.26 moles of metallic sodium (75 grams). To this mixture was slowly added, with stirring, 2.06 moles of vinylidene chloride under a nitrogen atmosphere during which the temperature of the reaction mixture increased from 100° to 181° C. with the concomitant precipitation of sodium chloride. The reaction mixture was then filtered to yield a liquid filtrate and solid sodium chloride.

The solid was washed and oven dried to give 191 grams of sodium chloride which calculated as a 95 percent yield of sodium chloride based on the sodium used in the reaction.

The liquid filtrate was vacuum distilled to yield 287 grams of distillate of the orthoacetate of tetrahydrofurfuryl alcohol (53.4 percent yield) having a boiling point of 178 to 185° C. at 1.5 millimeters of mercury. The distillate fraction boiling at 151° to 154° C. at 0.5 millimeter of mercury was analyzed as follows:

*Analysis.*—Calculated for $C_{14}H_{24}O_6$: C, 61.9; H, 9.1. Found: C, 62.3; H, 9.3. Molecular weight: Calculated 330. Found 326.

The infrared spectrum showed an absence of OH, C=O, and C=$CH_2$ absorption bands.

EXAMPLE VII

A mixture of the sodium alcoholate of tetrahydrofurfuryl alcohol in the alcohol was prepared by reacting 4.90 moles of tetrahydrofurfuryl alcohol (500 grams) with 1.09 moles of metallic sodium (25 grams). To this mixture was slowly added, with stirring, 0.70 mole of 1,2,2-trichloroethene under a nitrogen atmosphere during which the temperature of the reaction mixture increased from 93° to 117° C. with the concomitant precipitation of sodium chloride. The reaction mixture was then filtered to yield a liquid filtrate and solid sodium chloride.

The solid was washed and oven dried to give 53 grams of sodium chloride which calculated as a 83 percent yield of sodium chloride based on the sodium used in the reaction.

The liquid filtrate was vacuum distilled to yield 27 grams of a distillate of the orthomonochloroacetate of tetrahydrofurfuryl alcohol (13.6 percent yield) having a boiling point of 145° to 160° C. at 1.5 millimeters of mercury. The distillate was analyzed as follows:

*Analysis.*—Calculated for $C_{17}H_{29}O_6Cl$: C, 56.0; H, 8.0; Cl, 9.8. Found: C, 55.8; H, 8.2; Cl, 9.6. Molecular weight: Calculated 364. Found 321.

The infrared spectrum analysis showed an absence of —OH, C=O, and C=$CH_2$ absorption bands.

EXAMPLE VIII

A mixture of the sodium alcoholate of propylene glycol monomethyl ether in the alcohol was prepared by reacting 11.1 moles of propylene glycol monomethyl ether (1000 grams) with 3.0 moles of metallic sodium (69 grams). To this mixture was slowly added, with stirring, 1.8 moles of 1,1-dichloro-1-propene under a nitrogen atmosphere during which the temperature of the reaction mixture increased from 105° to 115° C. with the concomitant precipitation of sodium chloride. The reaction mixture was then filtered to yield a liquid filtrate and solid sodium chloride.

The solid was washed and oven dried to give 157 grams of sodium chloride which calculated as a 90 percent yield of sodium chloride based on the sodium used in the reaction.

The liquid filtrate was vacuum distilled to yield 27.0 grams of a distillate of the methylketene di(2-methoxypropyl) acetal (8.3 percent yield) having a boiling point of 81° C. at 0.1 millimeter of mercury. The distillate was analyzed as follows:

*Analysis.*—Calculated for $C_{11}H_{22}O_4$: C, 60.6; H, 10.1. Found: C, 60.4; H, 9.9. Molecular weight: Calculated 218. Found 205.

The infrared spectrum showed a strong C=C doublet at 1650 cm.$^{-1}$ and 1620 cm.$^{-1}$.

EXAMPLE IX

A mixture of the sodium alcoholate of the 1,2-propylene oxide adduct of glycerol having a molecular weight of about 3000 was prepared by reacting 0.5 mole of the said adduct (1500 grams) with 0.65 mole of metallic sodium (15 grams). To this mixture was slowly added, with stirring, 1.03 moles of vinylidene chloride under a nitrogen atmosphere during which the temperature of the reaction mixture increased from 120° to 130° C. with the concomitant precipitation of sodium chloride. The reaction mixture was then filtered to yield a liquid filtrate and solid sodium chloride. The solid sodium chloride was not collected.

The grey-tan residue product had a viscosity of 770 cps. at 25° C. as compared with the adduct itself which has a viscosity of 480 cps. at 25° C.

Infrared spectrum analysis of this residue product revealed a medium sharp peak at 1650 cm.$^{-1}$ which was postulated to be the ketene acetal (C=CH$_2$) absorption, and identified the product as the ketene acetal of propylene oxide adduct of glycerol.

EXAMPLE X

A mixture of the sodium alcoholate of polyethylene oxide having a molecular weight of about 400 in the alcohol was prepared by reacting 2.50 moles of the said polymer (1000 grams) with 3.75 moles of sodium hydroxide (150 grams). Water was removed from the solution by vacuum stripping at 110° C. and 5.0 millimeters of mercury for 2 hours. To this mixture was slowly added, with stirring, 2.76 moles of vinylidene chloride under a nitrogen atmosphere during which the temperature of the reaction mixture increased from 90° to 142° C. with the concomitant precipitation of sodium chloride. The reaction mixture was then filtered to yield a liquid filtrate and solid sodium chloride which was removed but not weighed. The liquid filtrate was refined with 30 grams of magnesium silicate and vacuum stripped for 2 hours at 90° C. and filtered to yield the residue product which was analyzed as follows:

Average hydroxyl number: 169.

*Analysis.*—Found: C, 52.8; H, 9.10; O, 37.12. Molecular weight: Found 661.

The infrared spectrum showed a medium sharp absorption band at 1740 cm.$^{-1}$ indicating C=O, and a medium sharp band at 3450 cm.$^{-1}$ indicating —OH.

EXAMPLE XI

A mixture of the sodium alcoholate of N,N-dimethyl ethanol amine in the alcohol was prepared by reacting 2.0 moles of the said amine (178 grams) with 4.35 moles of metallic sodium (100 grams), in 200 grams of xylene. To this mixture was slowly added over a 27 minute period with stirring, 1.24 moles of vinylidene chloride (120 grams) under a nitrogen atmosphere during which the exotherm of the reaction mixture was sporadic and rapid from 130° to 142° C. with the concomitant precipitation of sodium chloride. The reaction mixture was then filtered to yield a liquid filtrate and solid sodium chloride.

The solid was washed and oven dried to give 100 grams of sodium chloride which calculated as a 93.5 percent yield of sodium chloride based on the sodium used in the reaction.

The liquid filtrate was vacuum distilled to yield a higher boiling fraction boiling at 90°–91° C. at 2.0 millimeters of mercury.

*Analysis.*—Calc'd for $C_{10}H_{20}N_2O_2$: C, 59.4; H, 10.95; N, 13.84. Found: C, 60.5; H, 10.96; N, 13.74. Molecular weight: Calc'd: 202. Found: 201 (Menzies-Wright in benzene).

The infrared spectrum showed a very strong absorption at 1640 cm.$^{-1}$ which corresponds to a ketene acetal type absorption and identified the product as ketene di[2-(N,N-dimethylamino)ethyl]acetal.

EXAMPLE XII

A mixture of the sodium alcoholate of tetrahydrofurfuryl alcohol in diethylene glycol dimethyl ether was prepared by reacting 2.0 moles of tetrahydrofurfuryl alcohol (204 grams) with 2.0 moles of sodium metal (46.0 grams) in 408 grams of diethylene glycol dimethyl ether. To this mixture was added slowly, with stirring, 1.56 moles of vinylidene chloride (150 grams) under a nitrogen atmosphere. During the addition of the vinylidene chloride, the temperature of the reaction mixture increased from 90° C. to 140° C. with concomitant precipitation of sodium chloride. The reaction mixture was then filtered to yield a liquid filtrate and solid sodium chloride.

The solid was washed and oven dried to give a quantitative yield of sodium chloride based upon the sodium used in the reaction.

The liquid filtrate was vacuum distilled to yield 110 grams of distillate of ketene 2-tetrahydrofurfuryl acetal (0.483 mole corresponding to a 48.3 percent yield) having a boiling point of 109° to 110° C. at 2.0 millimeters of mercury. The distillate was analyzed as follows:

*Analysis.*—Calculated for $C_{12}H_{20}O_4$: C, 63.10; H, 8.77. Found: C, 62.93; H, 8.88. Molecular weight: Calculated 228. Found: 223.

Infrared spectrum analysis showed a very strong C=CH$_2$ absorption band at 1640 cm.$^{-1}$, and indicated no —OH absorption.

EXAMPLE XIII

The sodium alcoholate of 2-methoxyethanol was prepared by reacting 4.0 moles of 2-methoxyethanol (304 grams) with 4.0 moles of metallic sodium (92 grams) in 500 grams of diethylene glycol dimethyl ether as solvent. To this mixture was slowly added, with stirring, 243 grams of vinylidene chloride (2.51 moles) under a nitrogen atmosphere. During the addition of the vinylidene chloride the temperature of the reaction mixture increased from 130° to 170° C. with the concomitant precipitation of sodium chloride. The reaction mixture was then filtered to yield a liquid filtrate and solid sodium chloride.

The solid was washed several times with anhydrous ether and was oven dried to give 225 grams of sodium chloride which calculated as a 96 percent yield of sodium chloride based on the sodium used in the reaction.

The liquid filtrate was vacuum distilled to yield a distillate of 181 grams of the ketene di(2-methoxyethyl) acetal (51.4 percent yield) having a boiling point of 78–80° C. at 2.0 millimeters of mercury. The distillate was analyzed as follows:

*Analysis.*—Calculated for $C_8H_{16}O_4$: C, 54.5; H, 9.16. Found: C, 54.5; H, 9.05. Molecular weight: Calculated 176. Found: 178 (Menzies-Wright in benzene).

The infrared spectrum showed a very strong C=C absorption at 1640 cm.$^{-1}$ and characteristic hydroxyl absorption was completely absent. The nuclear magnetic resonance spectrum was in agreement wtih the ketene acetal structure.

EXAMPLE XIV

The sodium alcoholate of 3,4-dihydro-2H-pyran-2-methanol was prepared by reacting 1.94 moles of 3,4-dihydro-2H-pyran-2-methanol (226 grams) with 1.94 moles of metallic sodium (43 grams) in 150 grams of diethylene glycol dimethyl ether as solvent. To this mixture was slowly added, with stirring, 1.24 moles of vinylidene chloride (120 grams) under a nitrogen atmosphere. During the addition of the vinylidene chloride the temperature of the reaction mixture increased from 125° to 170° C. with the concomitant precipitation of sodium chloride. The reaction mixture was then filtered to yield a liquid filtrate and solid sodium chloride.

The solid was washed several times with anhydrous ether and was oven dried to give 104 grams of sodium chloride which calculated as an 89 percent yield of sodium chloride based on the sodium used in the reaction.

The liquid filtrate was vacuum distilled to yield a distillate or 71 grams of the ketene di(3,4-dihydro-2H-pyran-2-methoxy) acetal (28.4 percent yield) having a boiling point of 149°–150° C. at 2.4 millimeters of mercury. The distillate was analyzed as follows:

*Analysis.*—Calculated for $C_{14}H_{20}O_4$: C, 66.7; H, 7.94. Found: C, 66.5; H, 8.05. Molecular weight: Calculated 252. Found: 236 (Menzies-Wright in benzene).

15

The infrared spectrum showed a very strong C=C absorption at 1640 cm.$^{-1}$ and characteristic hydroxy absorption was completely absent.

EXAMPLE XV

The sodium alcoholate of 2-methoxyethanol was prepared by reacting 2.0 moles of 2-methoxyethanol (152 grams) with 2.0 moles of metallic sodium (46 grams) in a stirred flask containing 50 grams of diethylene glycol dimethyl ether as solvent. The sodium was dissolved over a 2.5 hour period at a temperature of 120° to 155° C. To this mixture was slowly added, with stirring, 0.62 mole of cis-1,2-dichloroethene (60 grams) over a 22 minute period while maintaining the mixture under a nitrogen atmosphere. During the addition of the cis-1,2-dichloroethene the temperature of the reaction mixture increased from 140° to 178° C. with the concomitant precipitation of sodium chloride. To aid in cooling the reaction mixture, 100 milliliters of diethyl ether was added. The reaction mixture was then filtered to yield a liquid filtrate and solid sodium chloride.

The solid was washed several times with anhydrous ether and was oven dried to give 74 grams of sodium chloride which calculated as a 63.3 percent yield of sodium chloride based on the sodium used in the reaction.

The liquid filtrate was vacuum distilled to yield a distillate of 82 grams of the ketene di(2-methoxyethyl) acetal (46.6 percent yield) having a boiling point of 80°–81° C. at 1.7 millimeters of mercury. The distillate was analyzed as follows:

*Analysis.*—Calculated for $C_8H_{16}O_4$: C, 54.5; H, 9.16. Found: C, 54.5; H, 9.05. Molecular weight: Calculated 176. Found: 178 (Menzies-Wright in benzene).

The infrared spectrum showed a very strong C=C absorption at 1640 cm.$^{-1}$. The nuclear magnetic resonance spectrum was in agreement with the ketene acetal structure ascribed to the product.

EXAMPLE XVI

The process and procedure cited in Example XV was repeated exactly, except that trans - 1,2 - dichloroethene was used in the place of the cis-1,2-dichliroethene. The observed exotherm was from 140° C. to 178° C., and the sodium chloride yield was 73 g. (62.4% based on the sodium). Distillation of the liquid filtrate gave 78 grams of ketene di(2-methoxyethyl) acetal (44.4% yield) as the higher boiling fraction. The boiling point observed was 80°–82° C. at 1.8 millimeters of mercury.

The infrared spectrum of the ketene actal of this Example was identical in all respects to infrared spectrum of the ketene acetal of Example XV.

EXAMPLE XVII

The process and procedure cited in Example XV was repeated exactly, except that vinylidene chloride was used in the place of the cis-1,2-dichlroethene (of Example XV). The observed exotherm was from 140° to 173° C., and the sodium chloride yield was 68 g. (58.1% based on the sodium). Distillation of the liquid filtrate and ether washings gave 67 grams of ketene di(2-methoxyethyl) acetal (38.1% yield) as the higher boiling fraction. The boiling point observed was 80°–81° C. at 1.8 millimeters of mercury.

The infrared spectrum of the ketene acetal of this Example was identical in all respects to the infrared spectrum of the ketene acetal of Example XV.

EXAMPLE XVIII

The process and procedure cited in Example XV was repeated exactly, except that a stoichiometric excess of 1.24 moles of cis-1,2-dichloroethene (120 grams) was used. The cis-1,2-dichloroethene was fed over a 55 minute time period. The observed exotherm was from 135° C. to 172° C., and the sodium chloride yield was quantitative at 119 grams. Distillation of the liquid filtrate gave 111 grams of ketene di(2-methoxyethyl) acetal (63.1% yield) as the major product fraction boiling at 80°–83° C. at 1.7 millimeters of mercury.

The infrared spectrum of the ketene acetal of this Example was identical in all respects to the infrared spectrum of the ketene acetal of Example XV.

In addition to the major product fraction, described above, there was a minor fraction of 11 grams of 2-methoxyethyl orthoacetate having a boiling point of 112–113° C. at 1.5 millimeters of mercury. The infrared spectra of this product was very different from the ketene acetal described above, and shows a weak C=C absorption at 1640 cm.$^{-1}$ together with a weak C=O absorption at 1720 cm.$^{-1}$. The analysis of this product fraction was as follows:

*Analysis.*—Calculated for $C_{11}H_{20}O_6$: C, 52.4; H, 9.54. Found: C, 52.52; H, 9.18. Molecular weight: Calculated 252. Found: 254 (Menzies-Wright in benzene).

EXAMPLE XIX

The process and procedure cited in Example XV was repeated exactly, except that a stoichiometric excess of 1.24 moles of trans-1,2-dichloroethene (120 grams) was used. The trans-1,2-dichloroethene was fed over a 34 minute time period. The observed exotherm was from 150° C. to 180° C. and the sodium chloride yield was 109 grams (93.1% based on the sodium). Distillation of the liquid filtrate and the ether washings gave 103 grams of ketene di(2-methoxyethyl) acetal (58.5% yield as the higher boiling fraction boiling at 80°–82° C. at 1.8 millimeters of mercury.

The infrared spectrum of the ketene acetal of this Example was identical in all respects to the infrared spectrum of the ketene acetal of Example XV.

EXAMPLE XX

The process and procedure cited in Example XV was repeated exactly, except that a stoichiometric excess of 1.24 moles of vinylidene chloride (120 grams) was used. The vinylidene chloride was fed over a 40 minute time period. The observed exotherm was from 150° C. to 176° C., and the sodium chloride yield was quantitative at 120 grams. Distillation of the liquid filtrate gave 133 grams of ketene di(2-methoxyethyl) acetal (75.6% yield) as the higher boiling fraction boiling at 81–83° C. at 1.9 millimeters of mercury.

The infrared spectrum of the ketene acetal of this Example was identical in all respects to the infrared spectrum of the ketene acetal of Example XV.

EXAMPLE XXI

The process and procedure cited in Example XV was repeated exactly, except that a stoichiometric excess of 1.24 moles of vinylidene chloride (120 grams) was used. In addition to this 50 grams of exlene was used as the solvent in place of the diethylene glycol dimethyl ether of Example XV. The vinylidene chloride was fed over a 14 minute time period, and the observed exotherm was from 140° C. to 174° C. The sodium chloride yield was 114 grams (97.4% based on the sodium). Distillation of the combined liquid filtrate and ether washings gave 132 grams of ketene di(2-methoxyethyl) acetal (75.0% yield) as the higher boiling product fraction boiling at 83°–86° C. at 2.2 millimeters of mercury.

The infrared spectrum of the ketene acetal of this example was identical in all respects to the infrared spectrum of the ketene acetal of Example XV.

EXAMPLE XXII

The process and procedure cited in Example XX was repeated except 1.25 moles of 1,2-dibromoethene (232 grams) was used in place of vinylidene chloride. The 1,2-dibromoethene was fed over a 26 minute time period, and the observed exotherm was from 135° C. to 157° C. The sodium bromide yield was 204 grams (99% based on the sodium). Distillation of the combined liquid filtrate and ether washings gave 66 grams of tri-(2-methoxyethyl) orthoacetate as the principal product (39.3% yield) which had a boiling point of 110°–114° C. at 1.6 millimeters of mercury.

The infrared spectrum of the orthoester of this example showed a medium (sharp) absorption at 1640 cm.$^{-1}$, and was identical in all respects to the infrared spectrum of the orthoester of Example XVIII.

EXAMPLE XXIII

The process and procedure cited in Example XV was repeated using 0.417 mole of 1,3-dimethoxy-2-propanol (50.0 grams), 0.417 mole of metallic sodium (9.5 grams) and 10 grams of xylene. .261 mole of cis-1,2-dichloroethene (25.3 grams) was fed over a 10-minute period, and the observed exotherm was from 140° C. to 157° C. The sodium chloride yield was 22 grams (91% based on the sodium). Distillation of the combined liquid filtrate and ether washings gave 20 grams of di(1,3-dimethoxy-2-propyl) ketene acetal (36.4% yield) as the higher boiling fraction boiling at 121°–122° C. at 1.8 millimeters of mercury.

*Analysis.*—Calculated for $C_{12}H_{24}O_6$: C, 54.5; H, 9.09. Found: C, 54.5; H, 9.15. Molecular weight: Calculated 264. Found: 277 (Menzies-Wright in benzene).

The infrared spectrum showed strong C═C absorption at 1650 cm.$^{-1}$.

EXAMPLE XXIV

The process and procedure cited in Example XV was repeated using 2.0 moles of 2-methoxyethanol (152 grams) 2.0 moles of sodium metal (46 grams) and 50 grams of xylene, 1.25 moles of 1,1,2-trichloroethene (164.5 grams) were fed to the mixture over a 38 minute time period, and the observed exotherm was from 137° C. to 150° C. The sodium chloride yield was 108 grams (92% based on the sodium). Distillation of the combined liquid filtrate and ether washings gave 112 grams of di(2-methoxyethyl) chloroketene acetal (53.2% yield) as the higher boiling product fraction boiling at 103°–106° C. at 1.6 millimeters of mercury.

*Analysis.*—Calculated for $C_8H_{15}O_4Cl$: C, 45.6; H, 7.12; Cl, 16.9. Found: C, 46.0; H, 7.51; Cl, 17.3. Molecular weight: Calculated 210.5. Found: 211 (Menzies-Wright in benzene).

The infrared spectrum showed strong C═C absorption at 1650 cm.$^{-1}$.

EXAMPLE XXV

The process and procedure cited in Example XV was repeated using 2.0 moles of tetrahydropyran-2-methanol (232 grams), 2.0 moles of metallic sodium (46.0 grams) and 50 grams of xylene. 1.24 moles of trans-1,2-dichloroethene (120 grams) was fed over a 37 minute time period, and the observed exotherm was from 140° C. to 170° C. The sodium chloride yield was quantitative at 120 grams. Distillation of the combined liquid filtrate and ether washings gave 155 grams of di(tetrahydropyran-2-methyl) ketene acetal as the higher boiling product fraction (60.5% yield) boiling at 142°–145° C. at 1.5 millimeters of mercury.

*Analysis.*—Calculated for $C_{14}H_{24}O_4$ (256): C, 65.6; H, 9.38. Found: C, 65.8; H, 9.26. Molecular weight: Calculated 256. Found 274 (Menzies-Wright in benzene).

A very strong C═C doublet appeared at 1640 and 1660 cm.$^{-1}$.

EXAMPLE XXVI

The process and procedure cited in Example XV was repeated using 1.0 mole of 2,2-dimethyl-1,3-dioxolane-4-methanol (107 grams), 1.0 mole of metallic sodium (23 grams), and 50 grams of diethylene glycol dimethyl ether as the inert solvent. 0.62 mole of trans-1,2-dichloroethene (60 grams) was fed to the mixture over a 14 minute period, and the observed exotherm was from 130° C. to 158° C. The sodium chloride yield was quantitative at 66 grams (based on the sodium). Distillation of the combined liquid filtrate and ether washings gave 44 grams of di(2,2-dimethyl - 1,3 - dioxolane-4-methyl) ketene acetal (0.153 mole) (30.6% yield) as the higher boiling product fraction. Cooling of this product to room temperature, or below, resulted in the formation of colorless matted needles. The product had a boiling point of 130°–132° C. at 1.1 millimeters of mercury, and a melting point of 27°–30° C.

*Analysis.*—Calculated for $C_{14}H_{24}O_6$ (288): C, 58.3; H, 8.39. Found: C, 57.9; H, 8.60. Molecular weight: Calculated 288. Found: 288 (Menzies-Wright in benzene).

The infrared spectrum showed strong C═C absorption at 1640 cm.$^{-1}$.

EXAMPLE XXVII

The process and procedure cited in Example XV was repeated using 2.0 moles of 2-methoxyethanol (152 grams) 2.0 moles of metallic sodium (46.0 grams) and 50 grams of xylene. 1.25 moles of 1,2,3-trichloro-1-propene (182 grams) was fed to the mixture over a 41 minute time period, and the observed exotherm was from 135° C. to 153° C. The sodium chloride yield was quantitative at 120 grams. Distillation of the combined liquid filtrate and ether washings gave 23 grams of a colorless liquid as the higher boiling product fraction. This fraction obtained was redistilled and the major fraction obtained from the redistillation, said fraction boiling at 110°–110.5° C. at 1.5 millimeters of mercury was analyzed.

*Analysis.*—Calculated for $C_9H_{17}O_4Cl$: C, 48.1; H, 7.63; Cl, 15.78. Found: C, 49.81; H, 6.80; Cl, 8.66.

EXAMPLE XXVIII

To a flask equipped with a stirrer and condenser are added 1.0 mole of 3-methoxy-1-propanol (90.0 grams) and 100 grams of diethylene glycol dimethyl ether. 1.0 mole of metallic sodium (23.0 grams) was dissolved therein over a 2 hour period at a temperature of 120–140° C.

To the mixture was added dropwise 0.62 mole of vinylidene chloride (60.0 grams) over a 15 minute time period. The temperature of the flask contents rose from 130° C. to a maximum of 156° C., with the concomitant precipitation of solid sodium chloride. Stirring was continued for an additional 10 minute after the vinylidene chloride addition was completed. Diethyl ether (200 grams) was then added to the flask and the mixture vacuum filtered through a fritted glass funnel. The vacuum dried sodium chloride yield was 50 grams (85% based on the sodium).

The liquid filtrate was vacuum distilled to yield, as the higher boiling product fraction, 16 grams of di(3-methoxy-1-propyl) ketene acetal (15.7% yield) which had a boiling point of 101°–102° C. at 2.8 millimeters of mercury.

*Analysis.*—Calculated for $C_{10}H_{20}O_4$: C, 58.8; H, 9.81. Found: C, 58.95; H, 9.97. Molecular weight: Calculated 204. Found: 203 (Menzies-Wright in benzene).

The infrared spectrum showed strong C═C absorption at 1640 cm.$^{-1}$.

EXAMPLE XXIX

To a flask equipped with a stirrer and condenser are added 2.0 moles of 3-methoxy-1-butanol (208 grams), and 50 grams of xylene. 2.0 moles of metallic sodium (46.0 grams) was dissolved therein over a 2 hour period at a temperature of 120–150° C. and 1.24 moles of vinylidene chloride (120 grams) was added dropwise over a 15 minute time period. The temperature of the flask contents rose from 125° C. to a maximum of 154° C. Stirring was continued for an additional 10 minutes after the addition was complete. Diethyl ether (100 milliliters) was then added to the flask, serving to both cool the flask contents to about 60° C., and to reduce the viscosity. This mixture was then vacuum filtered through a fritted glass funnel. The solid sodium chloride cake was washed with 3–20 milliliter portions of fresh diethyl ether. The vacuum dried solid sodium chloride yield was 93 grams (79% based on the sodium).

The combined liquid filtrate and ether washings were vacuum distilled to yield, as the higher boiling fraction, 83 grams of ketene di(3-methoxy-1-butyl) acetal (35.8% yield) which had a boiling point of 100°–104° C. at 1.5 millimeters of mercury.

*Analysis.*—Calculated for $C_{12}H_{24}O_4$: C, 62.1; H, 10.35. Found: C, 62.3; H, 10.67. Molecular weight: Calculated 232. Found: 237(Menzies-Wright in benzene).

The infrared spectrum showed strong C=C absorption at 1640 cm.$^{-1}$.

EXAMPLE XXX

The process and procedure cited in Example XXIX was repeated exactly, except that a stoichiometric excess of 1.24 moles of cis-1,2-dichloroethene (120 grams) was used. The cis-1,2-dichloroethene was fed over a 17 minute time period. The observed exotherm was from 141° C. to 156° C., and the sodium chloride yield was quantitative at 132 grams. Distillation of the combined liquid filtrate and ether washings gave 87 grams of ketene di(3-methoxy-1-butyl) acetal (37.5% yield) as the major product fraction boiling at 104°–105° C. at 1.6 millimeters of mercury.

The infrared spectrum of the ketene acetal of this Example was identical in all respects to the infrared spectrum of the ketene acetal of Example XXIX.

EXAMPLE XXXI

To a flask was added 0.00142 mole of ketene di(2-methoxyethyl) acetal (2.50 grams) and 0.001 gram of anhydrous calcium chloride. The flask was stoppered and maintained at room temperature for 24 hours. There was formed an essentially quantitative yield of the homopolymer of ketene di(2-methoxyethyl) acetal which appeared as a white solid and exhibited a melting point of 198°–208° C. The polymer darkened upon heating. The white solid was then vacuum dried at 60° C. for 18 hours and 2–3 millimeters of mercury to give a light brown solid melting at 200 to 210° C. analyzed as follows:

*Analysis.*—Calculated for

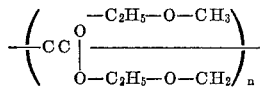

C, 54.5; H, 9.16. Found: C, 54.34; H, 9.62.

EXAMPLE XXXII

The process and procedure of Example 31 was repeated with 0.00198 mole of ketene di(3,4-dihydro-2H-pyran-2-methyl) acetal (5.00 grams) and 0.001 gram of anhydrous calcium chloride. These materials were maintained at 60° C. for 24 hours and yielded a waxy yellow polymeric product identified as the homopolymer of the di (3,4-dihydro-2H-pyran-2-methyl) acetal. After vacuum drying the weight loss was 0.05 gram indicating a quantitative yield of homopolymer. Analysis of the polymer was as follows: C, 65.34, H, 8.25.

EXAMPLE XXXIII

In a stoppered bottle were placed 0.050 mole of ketene di(2-methoxyethyl) acetal (8.80 grams), 0.050 mole of ethyl vinyl ether, (3.60 grams) and 0.002 gram of anhydrous calcium chloride. The contents were maintained overnight at room temperature. There was obtained a solid mass of a colorless waxy solid which was vacuum dried at 100° C. and 1–2 millimeters of mercury for 1 hour to yield 1.20 grams of a yellow solid copolymer of ketene di(2-methoxyethyl) acetal and ethyl vinyl ether equivalent to a 67% yield. The copolymer was a tacky wax-like solid which was water soluble and was analyzed as follows: C, 52.48; H, 8.68.

EXAMPLE XXXIV 1-bromo-2-ethoxyethene was prepared by the reaction of vinyl ethyl ether and bromine in the presence of a N,N-dimethylanaline in a light petroleum ether solvent at −40° C.

To a solution of 0.50 mole of 2-methoxyethanol (380 grams) in 25 grams of xylene was added 11.5 grams of methyl sodium at a temperature of 100–130° C. under a nitrogen atmosphere. When solution of sodium was complete, 1-bromo-2-ethoxyethene prepared above was added dropwise to the mixture over a 50-minute period at 130–140° C. with rapid stirring. Stirring was continued for an additional two hours at 140° C. with the precipitation of solid sodium bromide. The reaction mixture was then filtered to yield a yellow liquid filtrate and the solid sodium bromide. The sodium bromide was washed several times with anhydrous ether and was dried overnight. The yield was 39 grams which was equivalent to a 76% yield based upon the sodium used in the reaction. Distillation of the combined liquid filtrates and ether washings gave 35 grams of ketene ethyl 2-methoxyethyl acetal (48.0% yield) as the principle product fraction. The product had a boiling point of 40.0–40.5° C. at 0.5 millimeter of mercury. The analysis was as follows:

*Analysis.*—Calculated for $C_7H_{14}O_3$: C, 57.5; H, 9.65. Found: C, 57.3; H, 9.89. Molecular weight: Calculated 146. Found: 148 (Menzies-Wright in benzene).

The infrared spectrum showed a strong C=C absorption at 1640 cm.$^{-1}$.

What is claimed is:

1. A ketene acetal of the formula:

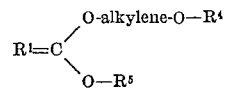

wherein $R^1$ is alkylidene containing from 1 to 4 carbon atoms and $R^4$ and $R^5$ are alkyl containing from 1 to 6 carbon atoms and said alkylene group is selected from the class consisting of 1,2- and 1,3-alkylene groups.

2. Ketene di(2-methoxyethyl) acetal.

3. Ketene di(2-(N,N-dimethylaminoethyl)) acetal.

4. A compound of the formula:

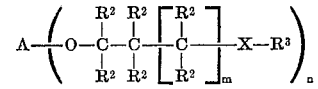

(1) where $n$ is an integer from 2 to 3, and $m$ is an integer from 0 to 1;

(2) wherein A represents an organic radical selected from the group consisting of tertiary alkyl radicals of the formula:

and secondary 1-alkenyl radicals of the formula:

wherein R is selected from the group consisting of alkyl and chloroalkyl, each containing from 1 to 4 carbon atoms, and R′ is selected from the group consisting of alkylidene and chloroalkylidene, each containing from 1 to 4 carbon atoms;

(3) wherein X is selected from the group consisting of —O—, and

wherein R″ is alkyl, of from 1 to 4 carbon atoms;

(4) wherein each $R^2$ individually is selected from the group consisting of hydrogen, alkyl of from 1 to 8 carbon atoms and monocyclic and bicyclic hydrocarbon aryl, alkaryl and aralkyl groups contain- 6 to 12 carbon atoms, and when taken with $R^3$ forms $R^3$ forms part of a saturated divalent chain which forms a heterocyclic ring containing X as the heterocyclic atom;

(5) wherein R³ is selected from the group consisting of alkyl of from 1 to 6 carbon atoms, alkoxyalkyl and polyoxyalkylene, containing 2 to 4 carbon atoms in each alkylene unit, and when taken with any R² forms part of a saturated divalent chain which forms a heterocyclic ring containing X as the heterocyclic atom.

5. A ketene acetal of the formula:

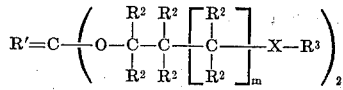

(1) wherein $m$ is an integer from 0 to 1;
(2) wherein R' is selected from the group consisting of alkylidene and chloroalkylidene, each containing from 1 to 4 carbon atoms;
(3) wherein X is selected from the group consisting of —O—, and

wherein R'' is alkyl of from 1 to 4 carbon atoms;
(4) wherein each R² individually is selected from the group consisting of hydrogen, alkyl of from 1 to 8 carbon atoms and monocyclic and bicyclic hydrocarbon aryl, alkaryl and aralkyl groups containing 6 to 12 carbo natoms, and when taken with R³ forms part of a saturated divalent chain which forms a heterocyclic ring containing X as the heterocyclic atom;
(5) wherein R³ is selected from the group consisting of alkyl of from 1 to 6 carbon atoms, alkoxyalkyl and polyoxyalkylene each containing 2 to 4 carbon atoms in each alkylene unit, and when taken with any R² forms part of a saturated divalent chain which forms a heterocyclic ring containing X as the heterocyclic atom.

6. An orthoester of the formula:

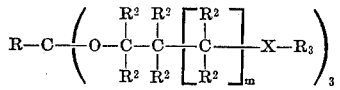

(1) wherein $m$ is an integer from 0 to 1;
(2) wherein R is selected from the group consisting of alkyl and chloroalkyl, each containing from 1 to 4 carbon atoms;
(3) wherein X is selected from the group consisting of —O—, and

wherein R'' is alkyl, of from 1 to 4 carbon atoms;
(4) wherein each R² individually is selected from the group consisting of hydrogen, alkyl of from 1 to 8 carbon atoms and monocyclic and bicyclic hydrocarbon aryl, alkaryl and aralkyl groups containing 6 to 12 carbon atoms, and when taken with R³ forms part of a saturated divalent chain which forms a heterocyclic ring containing X as the heterocyclic atom;
(5) wherein R³ is selected from the group consisting of alkyl of from 1 to 6 carbon atoms, alkoxyalkyl, and polyoxyalkylene each containing 2 to 4 carbon atoms in each alkylene unit, and when taken with any R² forms part of a saturated divalent chain which forms a heterocyclic ring containing X as the heterocyclic atom.

7. A process for the production of ketene acetals which comprises reacting (a) sodium alcoholates of alcoholic hydroxy compounds of the formula:

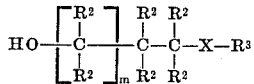

wherein $m$ is an integer from 0 to 1, wherein X is selected from the group of —O—, and

wherein R'' is alkyl of from 1 to 4 carbon atoms, wherein each R² individually is selected from the group consisting of hydrogen, alkyl of from 1 to 8 carbon atoms and monocyclic and bicyclic hydrocarbon aryl, alkaryl and aralkyl groups containing 6 to 12 carbon atoms, and when taken with R³ forms part of a divalent saturated chain which forms a heterocyclic ring containing X as the heterocyclic atom, and wherein R³ is selected from the group consisting of alkyl of from 1 to 6 carbon atoms, alkoxyalkyl and polyoxyalkylene containing 2 to 4 carbon atoms in each alkylene unit, and when taken with any R² forms part of a divalent saturated chain which forms a heterocycle containing X as the heterocyclic atom; with (b) a haloalkene of the formula:

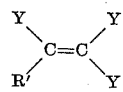

wherein Y is selected from the group consisting of halogen and hydrogen, at least two of said Y moieties being halogen, and wherein R' is selected from the class of hydrogen and alkyl with the proviso that if $R_2$ is alkyl at least one Y moiety is hydrogen; in such amount as to provide approximately two moles of said alcoholate per mole of said dihaloalkene.

8. The process of claim 7 wherein the haloalkene is a dichloroethene.

9. A process for the production of orthoesters which comprises reacting a solution comprising (a) an alcoholic hydroxy compound and a compound selected from the group of sodium alcoholates of an alcoholic hydroxy compound, wherein said alcoholic hydroxy compound corresponds to the formula:

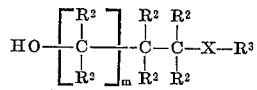

wherein $m$ is an integer from 0 to 1, wherein X is selected from the group of —O—, and

wherein R'' is alkyl, of from 1 to 4 carbon atoms, wherein each R² individually is selected from the group consisting of hydrogen, alkyl of from 1 to 8 carbon atoms and monocyclic and bicyclic hydrocarbon aryl, alkaryl and aralkyl groups containing 6 to 12 carbon atoms, and when taken with R³ forms part of a divalent saturated chain which forms a heterocyclic ring containing X as the heterocyclic atom, and wherein R³ is selected from the group of alkyl of from 1 to 6 carbon atoms, alkoxyalkyl and polyoxyalkylene containing 2 to 4 carbon atoms in each alkylene unit, and when taken with any R² forms part of a divalent saturated chain which forms a heterocycle containing X as the heterocyclic atom; with (b) a haloalkene of the formula:

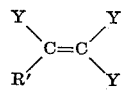

wherein Y is selected from the group consisting of halogen and hydrogen, at least two of said Y moieties being halogen, and wherein R' is selected from the class of hydrogen ,alkyl with the proviso that if R' is alkyl at least one Y moiety is hydrogen; the said alcoholate being present in an amount so as to provide at least two moles of the said alcoholate per mole of the said dichloroalkene, the said alcoholic hydroxy compound being present in both the alcoholate and the hydroxy form in an amount so as to provide at least 3 moles of the said alcoholic hydroxy compounds per mole of the said dichloroalkene.

10. A process for producing mixed ketene acetals which comprises reacting (a) a compound selected from the group consisting of sodium alcoholates of alcoholic hydroxy compounds of the formula:

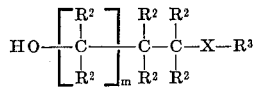

wherein $m$ is an integer from 0 to 1, wherein X is selected from the group of —O—, and

wherein R" is alkyl of from 1 to 4 carbon atoms, wherein each $R^2$ individually is selected from the group consisting of hydrogen, alkyl of from 1 to 8 carbon atoms and monocyclic and bicyclic hydrocarbon aryl, alkaryl and aralkyl groups containing 6 to 12 carbon atoms, and when taken with $R^3$ forms part of a divalent saturated chain which forms a heterocyclic ring containing X as the heterocyclic atom, and wherein $R^3$ is selected from the group consisting of alkyl of from 1 to 6 carbon atoms, alkoxyalkyl and polyoxyalkylene containing 2 to 4 carbon atoms in each alkylene unit, and when taken with any $R^2$ forms part of a divalent saturated chain which torms a heterocycle containing X as the heterocyclic atom; with (b) a β-halo-α,β-alkenyl ether of the formula:

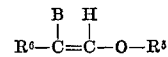

wherein $R^6$ is alkyl of up to 3 carbon atoms, B is halogen and $R^5$ is selected from the group consisting of alkyl of from 1 to 6 carbon atoms, monocyclic and bicyclic hydrocarbon aryl, alkaryl and aralkyl groups containing 6 to 12 carbon atoms and poly(oxyalkylene), containing 2 to 4 carbon atoms in each alkylene unit; in the presence of a tertiary amine for a time sufficient to produce the mixed ketene acetal.

11. Ketene di(3,4-dihydro-2H-pyran-2-methoxy) acetal.

No references cited.

NICHOLAS S. RIZZO, *Primary Examiner.*

F. A. MIKA, *Assistant Examiner.*

U.S. Cl. X.R.

260—247.5, 247.7, 268, 294.7, 309.7, 326.5, 340.7, 345.9, 583, 615, 874, 91.1, 80.3

UNITED STATES PATENT OFFICE
CERTIFICATE OF CORRECTION

Patent No. 3,419,580            December 31, 1968

William C. Kuryla

It is certified that error appears in the above identified patent and that said Letters Patent are hereby corrected as shown below:

In the heading to the printed specification, line 2, "KETONE" should read -- KETENE --. Column 1, lines 41 to 43, the formula should appear as shown below:

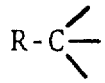

Column 2, lines 45 to 47, the formula should read as shown below

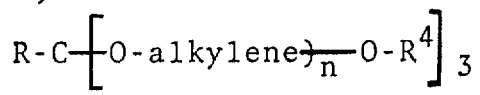

Column 4, line 11, the formula should appear as shown below:

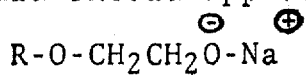

Column 5, lines 48 to 51, the formula should appear as shown below:

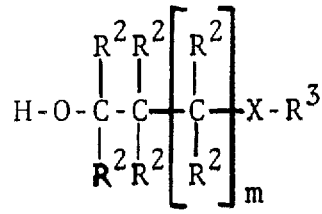

Column 7, lines 25 to 29, that portion of the formula reading

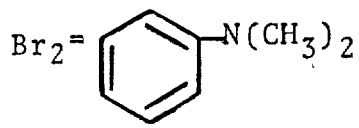    should read    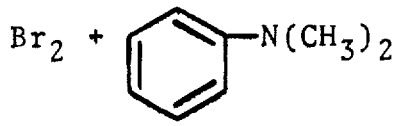

Column 19, lines 40 to 43, the formula should appear as shown below:

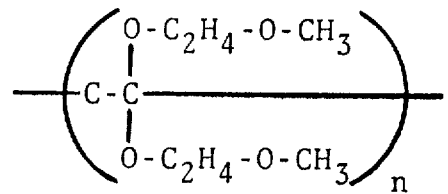

Signed and sealed this 24th day of March 1970.

(SEAL)
Attest:

EDWARD M. FLETCHER, JR.
Attesting Officer

WILLIAM E. SCHUYLER, JR.
Commissioner of Patents